Jan. 19, 1943.  E. E. OSTERMAN  2,308,623
AUTOMATIC CONTROL DEVICE
Filed Oct. 10, 1940  2 Sheets-Sheet 1
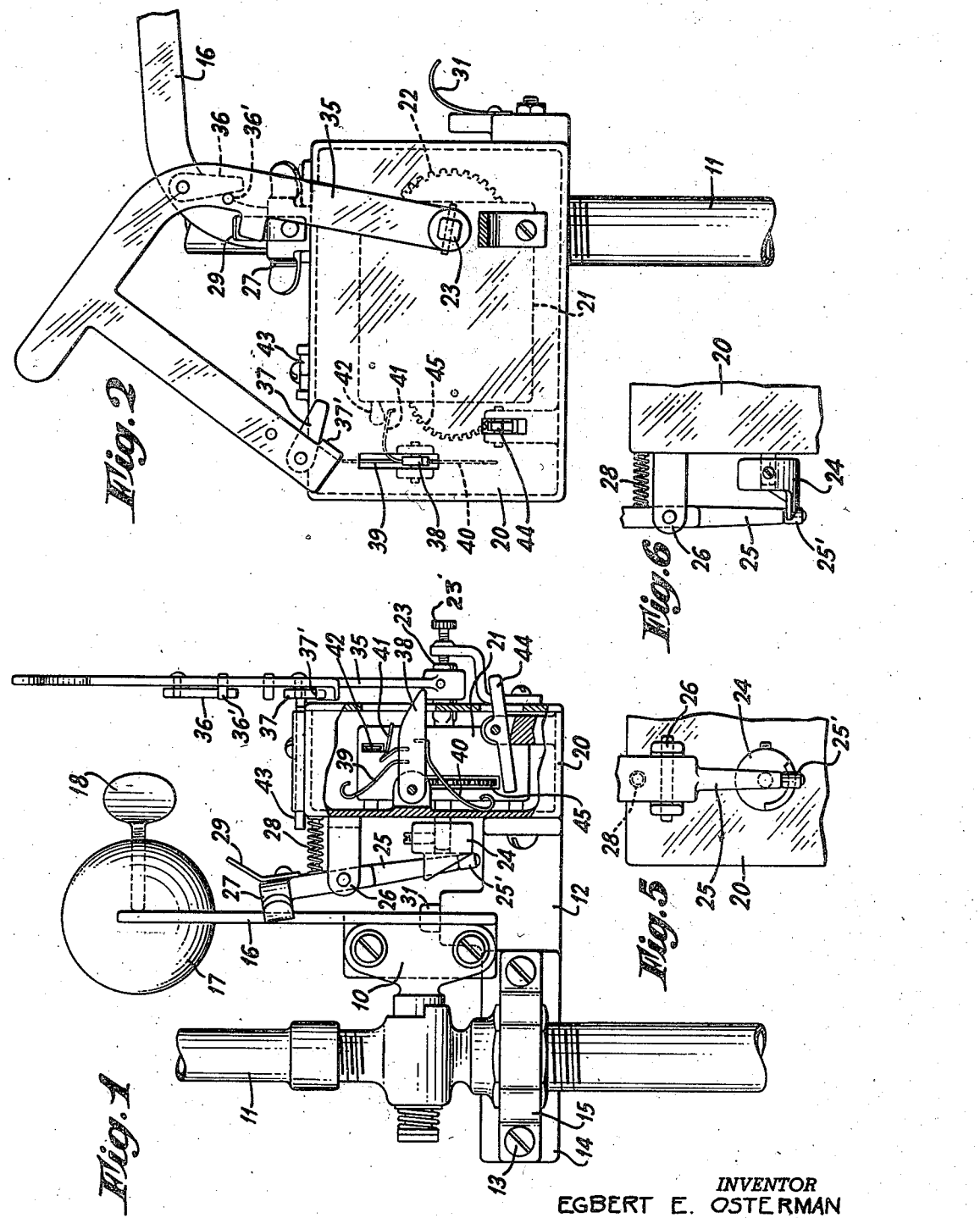
INVENTOR
EGBERT E. OSTERMAN
BY William A. Zalesak
ATTORNEY Jan. 19, 1943.　　　　E. E. OSTERMAN　　　　2,308,623
AUTOMATIC CONTROL DEVICE
Filed Oct. 10, 1940　　　　2 Sheets-Sheet 2
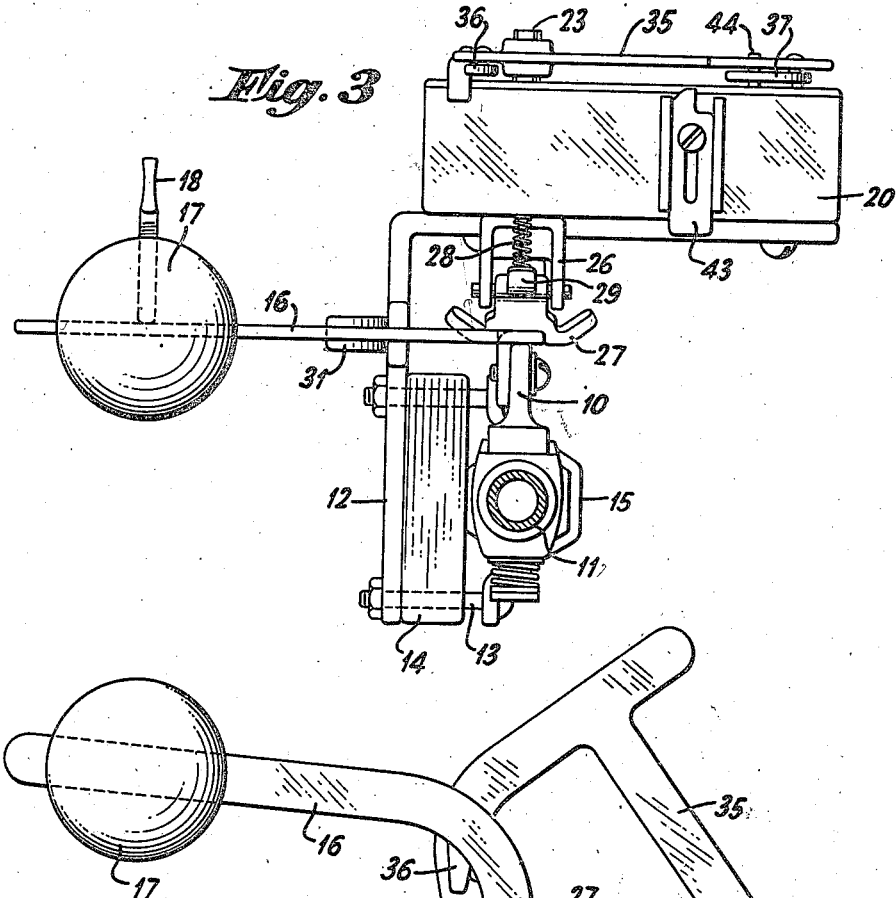
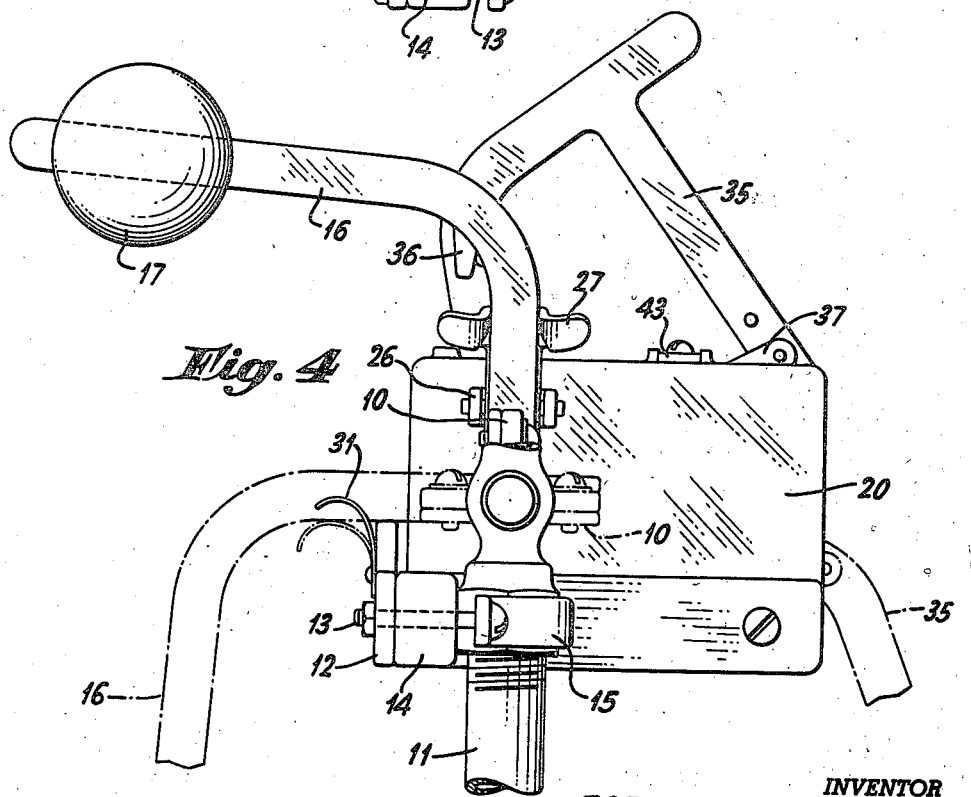
INVENTOR
EGBERT E. OSTERMAN
BY William A. Zalesak
ATTORNEY Patented Jan. 19, 1943

2,308,623

UNITED STATES PATENT OFFICE 2,308,623

AUTOMATIC CONTROL DEVICE

Egbert E. Osterman, Elizabeth, N. J.

Application October 10, 1940, Serial No. 360,559

9 Claims. (Cl. 161—7)

My invention relates to automatic valves for controlling the flow of fluids and more particularly to improvements in an automatic valve for controlling the flow of gas to a heating apparatus.

Present devices of this nature are subject to a number of objections. The usual device which employs a clock mechanism has no means for insuring that the device is fully wound before it is set in operation so that it will not accidentally run down and fail to release or close the valve after the predetermined period of time for the flow of gas has expired. These devices usually have no means of releasing the valve so that it can be closed after the automatic mechanism is once set into operation, in which case it is necessary for the device to go through an entire cycle before the flow of fluid can be shut off. The usual devices after being set into operation cannot be reset to repeat the cycle until the initial cycle has been completed. These devices are not as a rule easily adapted to standard manually operated valves without alterations to the valve or control device. In most arrangements where a clock mechanism is used, it continues to run and is not automatically stopped after it serves its purpose of shutting off the valve. Conventional devices are not rugged and are usually of a complicated design.

It is, therefore, the principal object of my invention to provide an improved device to be used in cooperation with a shut-off valve for automatically shutting off the valve after a predetermined period or predetermined periods of time.

It is another object of my invention to provide such a device which is actuated by a spring operated gear mechanism but which nevertheless insures that the spring device is fully tensioned prior to operation to insure positive operation of the device.

It is another object of my invention to provide such a device which will permit release of the shut-off mechanism at any time during the cycle of the control mechanism or to reset the same at any time during the cycle of the control mechanism.

It is a further object of my invention to provide such a device which is rugged and simple in construction and can be easily applied to standard manually operated valves without alterations to the valve or control device.

It is another object of my invention to provide such a device in which the spring operated mechanism is automatically stopped when the valve is shut off.

The novel features which I believe to be characteristic of my invention are set forth with particularity in the appended claims, but the invention itself will best be understood by reference to the following description taken in connection with the accompanying drawings in which Figure 1 is an end view of my device as applied to a conduit and its controlling valve and with parts removed to show details of construction, Figure 2 is a front view of my control device, Figure 3 is a plan view and Figure 4 is a back view of my control device applied to a valve and conduit, Figures 5 and 6 show details of construction of the cam operated latch mechanism of a control device made according to my invention.

As shown in Figure 1 a manually operated petcock valve 10 is connected into and controls the flow of fluid through conduit 11. The control mechanism proper is supported by means of a bracket 12, as best seen in Figures 1, 3 and 4, and secured to conduit 11 by means of the nut and bolts 13 extending through the block 14 and clamp 15. The valve is connected to a lever 16 having secured to its end an adjustable weight 17 secured in place by the lock screw 18. Lever 16 is biased by the weighted element 17 to always move the valves to a closed position.

The mechanism for controlling the operation of the valve includes the housing 20 in which the spring driven gear mechanism 21, the details of which are not shown, is mounted. This gear mechanism is driven by a coil spring 22 mounted on a shaft 23 extending through both sides of the housing 20. This gear train may be of the conventional type employed in clockwork and is provided with the usual escapement wheel to permit controlled rotation of the shaft 23 within the casing.

Secured to the inner end of the shaft is a cam 24 cooperating with the pivoted latch 25 which may have at its lower end the roller bearing 25' and is pivotally supported within the arms 26 extending from the casing 20. The upper end of the latch member 27 is formed into a U-shape to engage shut-off lever 16 between the legs of the U to maintain it in the upper position shown when the elements have the cooperative relation shown in the figures in the drawings. A biasing spring 28 positioned between the upper end of the latch and casing 20 forces the upper end of the latch mechanism into engagement with the shut-off lever 16. However, the latch may be manually released at any time by pressing on the finger 29 to rotate the latch in a clockwise direction as viewed in Figure 1. Normally, in operation as the shaft 23 is rotated the cam 24 is likewise rotated to urge the latch lever 25 in a clockwise direction to release the same from the valve shut-off lever 16. The details of cooperation of the cams and latch are best shown in Figures 5 and 6. A buffer spring 31 is secured to the casing to take up the shock of the weighted shut-off lever 16 when it drops to the dotted position shown in Figure 4 to shut off the valve.

To set the spring operated control mechanism into operation and to at the same time wind the spring, there is provided at the outer end of the shaft 23, which may be fixed against transverse movement by, for example, a set screw 23' to prevent misalignment of the cam and lever, the winding and setting lever 35. This lever more or less U-shaped is provided with a pair of pivoted elements 36 and 37 for purposes to be described. Stops 36' and 37' are also provided for limiting movement of these pivoted elements in a clockwise direction. Normally the winding and setting lever in its off position lies 90° anti-clockwise with respect to the position shown in Figure 2. It is positioned as indicated in dotted lines in Figure 4. It is rotated in a clockwise direction to set the device and start it into operation. A stop 35' limits clockwise movement. Mounted within the casing is a trip lever 38 provided with the springs 39 and 40 to hold it in the intermediate position shown. It is also provided with a spring finger 41 which engages with the escapement wheel extension 42 for setting the clock mechanism into operation.

As the winding lever 35 is rotated in a clockwise direction the finger 36 engages the lever 38 extending through the cover-up casing 20 lifting it and the spring finger 41 into engagement with the escapement mechanism 42. As the lever passes by this position the stop lever 38 is permitted to drop to its intermediate position as shown but at the same time releases the escapement mechanism 42 to set the clock into operation.

On the top of the housing is mounted a stop 43 which in the figures shown is in its retracted position to permit rotation of the setting and winding lever to the position shown. However, if it is desired to permit operation of the clock mechanism for only a portion of the cycle, this finger may be extended to stop rotation of the setting lever at a position intermediate its shut-off position and its full time cycle. However, when the lever is rotated to the position shown after the finger 36 engages the lever 38 to start the clock into operation, further movement continues to tighten the spring which acts like a brake on the clock mechanism and may cause the escapement mechanism to stop. To prevent this, the pivoted finger 37 is provided which again engages trip lever 38 to insure that the clock mechanism will go into operation.

In order to prevent the clock mechanism from running down after the valve has been shut off, I provide a brake lever 44 which engages the gear 45 of the gear train. When the setting lever 35 returns to shut-off position it rests against lever 44 which moves the inner end into engagement with gear 45 and stops the gear train. To permit fingers 36 and 37 to pass over the trip lever 38 they are pivoted so as to permit counter-clockwise movement of these fingers.

It will thus be seen that my device is simple, rugged, is easily attached, insures against accidental running down of the clock mechanism, permits release of the shut-off valve during any part of the cycle, permits resetting after any portion of the cycle has expired and automatically insures that the clock mechanism is always tensioned to insure that no accidental running down results.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is—

1. An automatic shut-off device for a conduit having a valve shut-off and including means adapted to be connected to said valve and biased to shut off said valve, a spring actuated gear mechanism having an escapement device and provided with a shaft, a cam on one end of said shaft and a starting and tensioning lever on the other end of said shaft, a latch mechanism positioned between the biased means and said cam and operably associated therewith, and means for biasing said latch against said biased shut-off means to maintain the valve in open position, said cam being rotated by said spring actuated gear mechanism for releasing said latch from its biasing means whereby the shut-off means moves said valve to shut-off position, a pivoted trip lever mounted to engage the escapement device of the spring operated mechanism to start operation of said spring operated mechanism, and means on said starting and tensioning lever for engaging the trip lever to actuate said trip lever when said starting lever is moved to starting and tensioning position.

2. An automatic shut-off device for a conduit having a valve shut-off and including means adapted to be connected to said valve and biased to shut off said valve, a spring actuated gear mechanism having an escapement device and provided with a shaft, a cam on one end of said shaft and a starting and tensioning lever on the other end of said shaft, a latch mechanism positioned between the biased means and said latch and operably associated therewith, and means for biasing said latch against said biased shut-off means to maintain the valve in open position, said cam being rotated by said spring actuated gear mechanism for releasing said latch from its biasing means whereby the shut-off means moves said valve to shut-off position, a pivoted trip lever mounted to engage the escapement device of the spring actuated gear mechanism to start operation of said spring actuated gear mechanism, and spaced pivoted fingers on said starting lever for engaging said trip lever to set said spring actuated gear mechanism into operation.

3. An automatic shut-off device for a conduit having a valve shut-off and including means adapted to be connected to said valve and biased to shut off said valve, a spring actuated gear mechanism having an escapement device and provided with a shaft, a cam on one end of said shaft and a starting and tensioning lever on the other end of said shaft, a latch mechanism positioned between the biased means and said latch and operably associated therewith, and means for biasing said latch against said biased shut-off means to maintain the valve in open position, said cam being rotated by said spring actuated gear mechanism for releasing said latch from its biasing means whereby the shut-off means moves said valve to shut-off position, a pivoted trip lever mounted to engage the escapement device of the spring actuated gear mechanism to start operation of said spring actuated gear mechanism, spaced pivoted fingers on said starting lever for engaging said trip lever to set said spring actuated gear mechanism into operation, and a stop finger position on the casing of the spring actuated gear mechanism and movable between two positions to limit movement of the starting and tensioning lever.

4. An automatic shut-off device for a conduit having a valve shut-off and including means adapted to be connected to said valve and consisting of a shut-off lever provided with a weighted device at one end for moving said valve to closed position, a housing including a spring operated gear train positioned adjacent said lever and including a shaft extending through said housing, a cam mounted on one end of said shaft and a starting and tensioning lever on the other end of said shaft, and a latch mechanism pivotally supported on said housing and extending between said cam and lever, one end of said latch engaging said cam and the other end of said latch being provided with a U-shaped yoke for receiving the shut-off lever for maintaining it in open position, an escapement mechanism for said spring operated gear train and a pivoted lever extending from said casing and adapted to be engaged by said starting and tensioning lever to actuate said escapement mechanism to start operation of said spring operated gear train to cause rotation of said shaft and cam to release said latch from said shut-off lever.

5. An automatic shut-off device for a conduit having a valve shut-off and including means adapted to be connected to said valve and consisting of a shut-off lever provided with a weighted device at one end for moving said valve to closed position, a housing including a spring operated gear train positioned adjacent said lever and including a shaft extending through said housing, a cam mounted on one end of said shaft and a starting and tensioning lever on the other end of said shaft, and a latch mechanism pivotally supported on said housing and extending between said cam and said shut-off lever, one end of said latch engaging said cam and the other end of said latch being provided with a U-shaped yoke for receiving the shut-off lever for maintaining it in open position, an escapement mechanism for said spring operated gear train and a pivot trip lever extending from said casing and adapted to be engaged by said starting and tensioning lever to actuate said escapement mechanism to start operation of said spring operated gear train to cause rotation of said shaft and cam to release said latch from said shut-off lever, said setting and tensioning lever being of U-shape and provided with a pair of pivoted elements for engaging the pivoted trip lever extending through the casing to move it into contact with the escapement mechanism to start operation of the spring operated gear train.

6. An automatic shut-off device for a conduit having a valve shut-off and including means adapted to be connected to said valve shut-off and biased to shut off said valve, a spring actuated gear mechanism having a shaft, a cam on one end of said shaft and a starting and tensioning lever on the other end of said shaft, a latch mechanism positioned between the shut-off means and said cam and operably associated therewith, means for biasing the latch against said shut-off means to maintain the valve in open position, said cam being rotated by said spring actuated gear mechanism for releasing said latch from its biasing means whereby the shut-off means moves said valve to shut-off position, and means associated with the spring actuated mechanism for starting said spring actuated mechanism, and means on said starting and tensioning lever for actuating said last means.

7. An automatic shut-off device for a conduit having a valve shut-off and including means adapted to be connected to said valve shut-off and biased to shut off said valve, a spring actuated gear mechanism, a cam operated by said spring actuated gear mechanism, a starting and tensioning lever for the spring operated gear mechanism, a latch mechanism positioned between the biased shut-off means and said cam and operably associated therewith, means for biasing the latch against said biased shut-off means to maintain the valve in open position, said cam being rotated by said spring actuated gear mechanism for releasing said latch whereby the shut-off means moves said valve to shut-off position, a pivoted trip lever mounted to engage the spring actuated gear mechanism to start said spring actuated gear mechanism and means on said starting and tensioning lever for engaging the trip lever to actuate said trip lever when the starting and tensioning lever is moved to starting and tensioning position.

8. An automatic shut-off device for a conduit having a valve shut-off and including means adapted to be connected to said valve shut-off and consisting of a shut-off lever provided with a weighted device at one end for moving said valve to a closed position, a housing including a spring operated gear train positioned adjacent said lever and including a shaft extending through said housing, a cam mounted on said shaft and a starting and tensioning lever on the other end of said shaft and a latch mechanism pivotally supported on said housing and extending between said cam and shut-off lever, one end of said latch engaging said cam and the other end of said latch being provided with a U-shaped yoke for receiving the shut-off lever.

9. An automatic shut-off device for a conduit having a valve shut-off and including means adapted to be connected to said valve shut-off and consisting of a shut-off lever provided with a weighted device at one end for moving said valve to a closed position, a housing including a spring operated gear train positioned adjacent said lever, a cam operated by the spring operated gear train and a starting and tensioning lever for said gear train, and a latch mechanism pivotally supported on said housing and extending between said cam and shut-off lever, one end of said latch engaging said cam and the other end of said latch being provided with a U-shaped yoke for receiving the shut-off lever.

EGBERT E. OSTERMAN.